United States Patent
Karim et al.

(10) Patent No.: US 10,065,387 B2
(45) Date of Patent: Sep. 4, 2018

(54) RECLOSABLE POUCH WITH LEAKPROOF CLOSURE AND METHOD OF MANUFACTURE

(75) Inventors: Rod M. Karim, San Diego, CA (US); Antonio Peralta, San Diego, CA (US); Miguel L. Aguilar, Escondido, CA (US)

(73) Assignee: S. C. Johnson & Son, Inc., Racine, WI (US)

( * ) Notice: Subject to any disclaimer, the term of this patent is extended or adjusted under 35 U.S.C. 154(b) by 451 days.

(21) Appl. No.: 13/384,257

(22) PCT Filed: Oct. 27, 2011

(86) PCT No.: PCT/US2011/058091
§ 371 (c)(1),
(2), (4) Date: Jan. 16, 2012

(87) PCT Pub. No.: WO2012/058428
PCT Pub. Date: May 3, 2012

(65) Prior Publication Data
US 2013/0108188 A1    May 2, 2013

Related U.S. Application Data

(60) Provisional application No. 61/407,351, filed on Oct. 27, 2010.

(51) Int. Cl.
*B65D 33/25* (2006.01)
*B31B 19/00* (2006.01)
(Continued)

(52) U.S. Cl.
CPC ............ *B31B 19/00* (2013.01); *B29C 43/021* (2013.01); *B29C 65/02* (2013.01);
(Continued)

(58) Field of Classification Search
CPC ............ B65D 33/2533; B65D 33/2591; B65D 33/2541; B65D 33/2508; B65D 33/2516;
(Continued)

(56) References Cited

U.S. PATENT DOCUMENTS 4,756,629 A * 7/1988 Tilman et al. .................. 383/63
4,787,880 A * 11/1988 Ausnit .......................... 493/213
(Continued)

OTHER PUBLICATIONS

PCT/US2011/058091, International Search Report and Written Opinion, Jun. 11, 2012.
(Continued)

*Primary Examiner* — Jes F Pascua
*Assistant Examiner* — Nina Attel

(57) ABSTRACT

A reclosable pouch that includes a receptacle having a storage chamber and a mouth in communication with the storage chamber, a hermetically sealable closure attached to the mouth, the closure including a first zipper strip and a second zipper strip, the first and second zipper strips being fused together in first and second zones situated at respective ends of the closure, a slider mounted to the closure, and a respective pair of round projections arranged back to back on first and second walls of the receptacle. The round projections are separate and distinct from each other and from zipper terminations of the first and second zippers, and the respective pair of round projections prevents further travel of the slider at opposing ends of the closure upon contact with sidewalls of the slider.

17 Claims, 11 Drawing Sheets

(51) Int. Cl.
  *B29C 70/74* (2006.01)
  *B29C 65/00* (2006.01)
  *B29C 65/02* (2006.01)
  *B29C 43/02* (2006.01)
  *B29L 31/00* (2006.01)
  *B29L 5/00* (2006.01)
  *B29C 65/08* (2006.01)
  *B29C 65/18* (2006.01)
  *B31B 70/81* (2017.01)

(52) U.S. Cl.
  CPC ...... *B29C 66/0342* (2013.01); *B29C 66/1122* (2013.01); *B29C 66/474* (2013.01); *B29C 66/73186* (2013.01); *B29C 66/73921* (2013.01); *B29C 70/74* (2013.01); *B65D 33/2591* (2013.01); *B29C 65/08* (2013.01); *B29C 65/18* (2013.01); *B29C 66/71* (2013.01); *B29C 66/8322* (2013.01); *B29L 2005/00* (2013.01); *B29L 2031/7128* (2013.01); *B31B 70/8131* (2017.08)

(58) Field of Classification Search
  CPC .............. B65D 33/2525; B65D 33/255; B65D 33/2558; B65D 33/2566; B31B 2219/9019; B31B 19/90; A44B 19/16; A44B 19/267
  USPC .......... 383/61.2, 63–65; 24/399, 400, 585.12
  See application file for complete search history.

(56) References Cited

U.S. PATENT DOCUMENTS

| | | | |
|---|---|---|---|
| 5,088,971 A * | 2/1992 | Herrington | 493/203 |
| 5,131,121 A * | 7/1992 | Herrington et al. | 24/436 |
| 5,238,306 A | 8/1993 | Heintz et al. | |
| 5,335,997 A | 8/1994 | Kanemitsu et al. | |
| 5,442,837 A * | 8/1995 | Morgan | 24/400 |
| 6,030,122 A | 2/2000 | Ramsey et al. | |
| 6,840,675 B2 | 1/2005 | Knight | |
| 6,968,604 B2 | 11/2005 | Crevier | |
| 7,320,662 B2 * | 1/2008 | Thieman | 493/213 |
| 7,347,908 B2 | 3/2008 | Share et al. | |
| 7,364,362 B2 | 4/2008 | Schneider et al. | |
| 7,416,340 B2 | 8/2008 | Schneider | |
| D588,931 S | 3/2009 | Kim | |
| 7,537,386 B2 | 5/2009 | Linton et al. | |
| 2004/0161170 A1 | 8/2004 | Linton et al. | |
| 2005/0063616 A1 * | 3/2005 | Chang | 383/5 |
| 2006/0029300 A1 | 2/2006 | Yoder et al. | |
| 2006/0056743 A1 * | 3/2006 | Kobetsky et al. | 383/64 |
| 2007/0028564 A1 * | 2/2007 | Ausnit | 53/412 |
| 2007/0292052 A1 * | 12/2007 | Hui et al. | 383/63 |
| 2009/0100650 A1 * | 4/2009 | Kim | B65D 33/2591 24/427 |
| 2011/0299797 A1 * | 12/2011 | Petkovsek | 383/64 |

OTHER PUBLICATIONS

Photograph of overall bag, LOCK & LOCK brand Smartbag Multi Storage Bag, 550 mm x 700 mm size, bag acquired 2011 to 2012.
Photograph of front view of slider on bag, LOCK & LOCK brand Smartbag Multi Storage Bag, 550 mm x 700 mm size, bag acquired 2011 to 2012.
Photograph of side view of slider on bag, LOCK & LOCK brand Smartbag Multi Storage Bag, 550 mm x 700 mm size, bag acquired 2011 to 2012.
Photograph of of slider removed from bag, LOCK & LOCK brand Smartbag Multi Storage Bag, 550 mm x 700 mm size, bag acquired 2011 to 2012.
Photograph of overall bag, Store Smart brand flat (large) bag, 21.5 inches x 33.5 inches size, bag acquired 2007 to 2009.
Photograph of brand packaging containing Store Smart brand flat (large) bag, 21.5 inches x 335 inches size, bag acquired 2007 to 2009.
Photograph of front view of slider on bag, Store Smart brand flat (large) bag, 21.5 inches x 33.5 inches size, bag acquired 2007 to 2009.
Photograph of side view of slider on bag, Store Smart brand flat (large) bag, 21.5 inches x 33.5 inches size, bag acquired 2007 to 2009.
Photograph of slider removed from bag, Store Smart brand flat (large) bag, 21.5 inches x 33.5 inches size, bag acquired 2007 to 2009.
Photograph of overall bag, Ultra PackMax Bag brand compression bag, 27 inches x 39 inches size, bag acquired 2007 to 2009.
Photograph of brand packaging containing Ultra PackMax Bag brand compression bag, 27 inches x 39 inches size, bag acquired 2007 to 2009.
Photograph of front view of slider on bag, Ultra PackMax Bag brand compression bag, 27 inches x 39 inches size, bag acquired 2007 to 2009.
Photograph of slider side view, Ultra PackMax Bag brand compression bag, 27 inches x 39 inches size, bag acquired 2007 to 2009.
Photograph of slider removed from bag, Ultra PackMax Bag brand compression bag, 27 inches x 39 inches size, bag acquired 2007 to 2009.

* cited by examiner

RECLOSABLE POUCH WITH LEAKPROOF CLOSURE AND METHOD OF MANUFACTURE

RELATED PATENT APPLICATION

This application claims foreign priority benefits under 35 U.S.C. § 365(a) of PCT International Patent Application No. PCT/US2011/058091 filed on Oct. 27, 2011, which PCT international application in turn claims priority to U.S. Provisional Application Ser. No. 61/407,351 filed on Oct. 27, 2010.

BACKGROUND

This invention generally relates to reclosable flexible bags whose interior volume is hermetically sealed when the bag is closed. In particular, the invention relates to, but is not limited to, evacuable reclosable storage bags having a zipper that is closed (but not opened) by operation of a slider or clip mounted on the zipper.

Collapsible, evacuable storage containers typically include a flexible, airtight bag, an opening through which a compressible article is inserted inside the bag, a zipper for closing the opening and hermetically sealing the bag, a U-shaped slider for closing the zipper, and one or more one-way valves or vents through which excess air is evacuated from the bag. A user places an article into the bag through the opening, seals the opening, and then removes air from the bag through the one-way valve or valves. As air is removed, the compressible article contained therein may be significantly compressed so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

Not only large, compressible items such as clothing may be stored in a collapsible, evacuable storage container. For example, it may be desirable to store bulk items made of small particles, such as powders or granulated resins, in an evacuated container. One situation that commonly occurs is that a particular bulk item is shipped in a large, rigid container such as a drum. Bulk items may be moisture sensitive and are sealed against moisture during shipment. But many times a user does not need to use the entire contents of the large container, and so once exposed to air the remaining bulk contents quickly become unusable and are thus wasted.

Many commercially available evacuable storage bags are provided with an inverted U-shaped slider or clip mounted to the plastic zipper. This slider is capable of closing an open zipper, i.e., by camming the opposing zipper strips into engagement during slider travel in either direction, but cannot be used to open a closed zipper. The slider does not have means for opening the zipper because typically such means would leave a gap in the zipper, thereby preventing formation of a hermetic seal.

In known reclosable bags, the zipper comprises a pair of mutually interlockable zipper strips, each zipper strip having one or more generally constant profiles extending across the mouth of the bag. For example, it is known to provide a reclosable bag having dual zippers which extend in parallel across the mouth of the bag. The ends of the zipper strips are joined together at the sides of the bag. For example, it is known to fuse the ends of the zipper strips together, at the same time that the bag side seals are formed, by the application of heat and pressure. This "thermal crushing" of the plastic zipper creates a transition between "as is" zipper and crushed zipper that is susceptible to the presence of leaks through which air can enter an evacuated bag. In addition, such crushing leaves the surface material flat at either end where the zipper ends are joined to each other and to the webs of film that form the front and rear walls of the bag.

There is a continuing need for improvements in the construction of flexible storage containers that need to be hermetically sealed. In particular, there is a need for an improved evacuable storage container wherein leakage is eliminated in the areas where the bag side seals overlap the joined ends of the zipper strips. There is also a need for a leakproof construction that provides means for stopping a U-shaped slider at either end of the bag mouth as it travels along the closure.

SUMMARY

The improved sealing method disclosed herein allows the ends of the closure to be joined while at the same time forming a dome-shaped projection at respective joined ends of the closure. In one embodiment the closure comprises a double zipper. The purpose of the dome structure is to prevent the slider or clip from coming off the bag when the consumer closes the double zippers. The ability of the clip to stay on the closure is a desirable benefit to the consumer. A bag without a zipper clip is difficult to close.

In addition, known methods leave the zipper profile(s) (i.e., the interlockable elements of the closure) to be randomly terminated. In accordance with the teaching herein, the ends of the zipper profiles are terminated using dies that allow the formation of uniform and consistent terminations in the zone where the ends of the zipper strips are joined.

The dome-shaped slider end stops and the zipper profile terminations are produced by heat sealing, either ultrasonically or through resistance heating, of the closure material. After the closure material has been softened by ultrasonic energy or resistance heating, dies are used to form the dome structures and terminations of the zipper profiles. In order to cause the soft material to harden in a short period of time, a cooling process is used to shorten the time required for the material to harden.

One aspect of the invention is a method of joining mutually interlocked first and second zipper strips made of thermoplastic material, wherein the first zipper strip comprises a first flange and first and second closure elements projecting from the first flange, and the second zipper strip comprises a second flange and third and fourth closure elements projecting from the second flange, the third and fourth closure elements being interlocked with the first and second closure elements respectively. The method comprising the following steps: (a) joining the first flange of the first zipper strip to a corresponding band-shaped zone of a first panel made of web material; (b) joining the second flange of the second zipper strip to a corresponding band-shaped zone of a second panel made of web material; (c) supplying heat and pressure in sufficient amounts in an area overlapping respective lengths of the interlocked first and third closure elements and the interlocked second and fourth closure elements to cause the closure elements to be at least partially crushed along the respective lengths; (d) applying heat and pressure in sufficient amounts in the area to cause thermoplastic material of the zipper strips to flow into first and second pairs of mutually opposed depressions located adjacent to and on opposite sides of the area; (e) advancing the first and second zipper strips to a position whereat the thermoplastic material formed by the first and second pairs of depressions is aligned with and received by third and fourth pairs of mutually opposed depressions located adjacent to and on opposite sides of the area, with empty space between each formed thermoplastic material and the respective depression that receives it; (f) applying sufficient pressure in the area to cause additional thermoplastic material of the zipper strips to flow into the third and fourth pairs of depressions; and (g) cooling the zipper strip thermoplastic material in the area.

Another aspect of the invention is a reclosable pouch comprising: a receptacle having a storage chamber and a mouth in communication with the storage chamber, a hermetically sealable closure installed in the mouth, and a slider mounted to the closure, which components have the following features. The receptacle comprises first and second walls made of thermoplastic web material, a first side seal that includes respective first marginal portions of the first and second walls, and a second side seal that includes respective second marginal portions of the first and second walls. The closure comprises first and second zipper strips made of thermoplastic material, the first and second zipper strips being fused together in first and second zones situated at respective ends of the closure and being unfused between the respective ends of the closure, an unfused portion of the first zipper strip comprising a first flange and first and second closure elements projecting from the first flange, and an unfused portion of the second zipper strip comprising a second flange and third and fourth closure elements projecting from the second flange, the closure elements spanning the space between the first and second zones. The slider comprises first and second sidewalls which force the closure elements of incoming unfused portions of the first and second zipper strips into mutual engagement as the slider travels along a portion of the closure where the closure elements of the first and second zipper strips are not mutually engaged. Each of the first and second zones comprises a respective pair of round projections arranged back to back to form respective obstacles to further travel of the slider at opposing ends of the closure, each round projection comprising thermoplastic material from portions of the first or second zipper strips other than the unfused portions.

A further aspect of the invention is a roll comprising a chain of reclosable pouch precursors connected by a multiplicity of transverse seals spaced at equals intervals along a lengthwise direction and having the following features. Each pouch precursor comprises a respective receptacle having a storage chamber and a mouth in communication with the storage chamber, and an airtight closure for closing the mouth, the storage chambers being disposed between respective pairs of the transverse seals. Each receptacle comprises respective confronting sections of first and second webs of thermoplastic material. Each closure comprises respective confronting sections of first and second zipper strips. Each transverse seal comprises a first zone where the first and second webs are fused together and a second zone where the first and second zipper strips are fused together. Each of the second zones comprises first and second pairs of round projections, the round projections of each pair being arranged back to back, and each round projection comprising thermoplastic material from portions of the first or second zipper strips in said second zone.

Other aspects of the invention are disclosed and claimed below.

BRIEF DESCRIPTION OF THE DRAWINGS

FIG. 6 is an isometric view of a tool which is one of two opposing tools used at a first crush station for crushing intervening plastic material of a work in process after each indexed advance thereof.

FIG. 7 is an isometric view of a stepped tool which is one of two opposing tools used at a second crushing station to further crush the plastic material previously crushed at the first crush station after each indexed advance.

FIG. 8 is a diagram showing an isometric view of one end of the stepped portion of the tool depicted in FIG. 7.

FIG. 9 is a diagram showing an isometric view of a tool having two dimples which is one of two opposing tools used at a pre-forming station for forming crushed plastic material into respective dome shapes that project on both sides of the work in process.

FIG. 10 is a diagram showing a sectional view of the tool depicted in FIG. 9, the section being taken along a plane that bisects the two dimples.

FIG. 11 is a diagram showing an isometric view of a tool having two hemispherical dimples and four zipper termination channels, which tool is one of two opposing tools used at a post-forming station for forming crushed plastic material into respective hemispherical dome shapes which are larger than the pre-formed dome shapes and also forming zipper terminations in the crush area.

Reference will now be made to the drawings in which similar elements in different drawings bear the same reference numerals.

DETAILED DESCRIPTION

Figure 1:
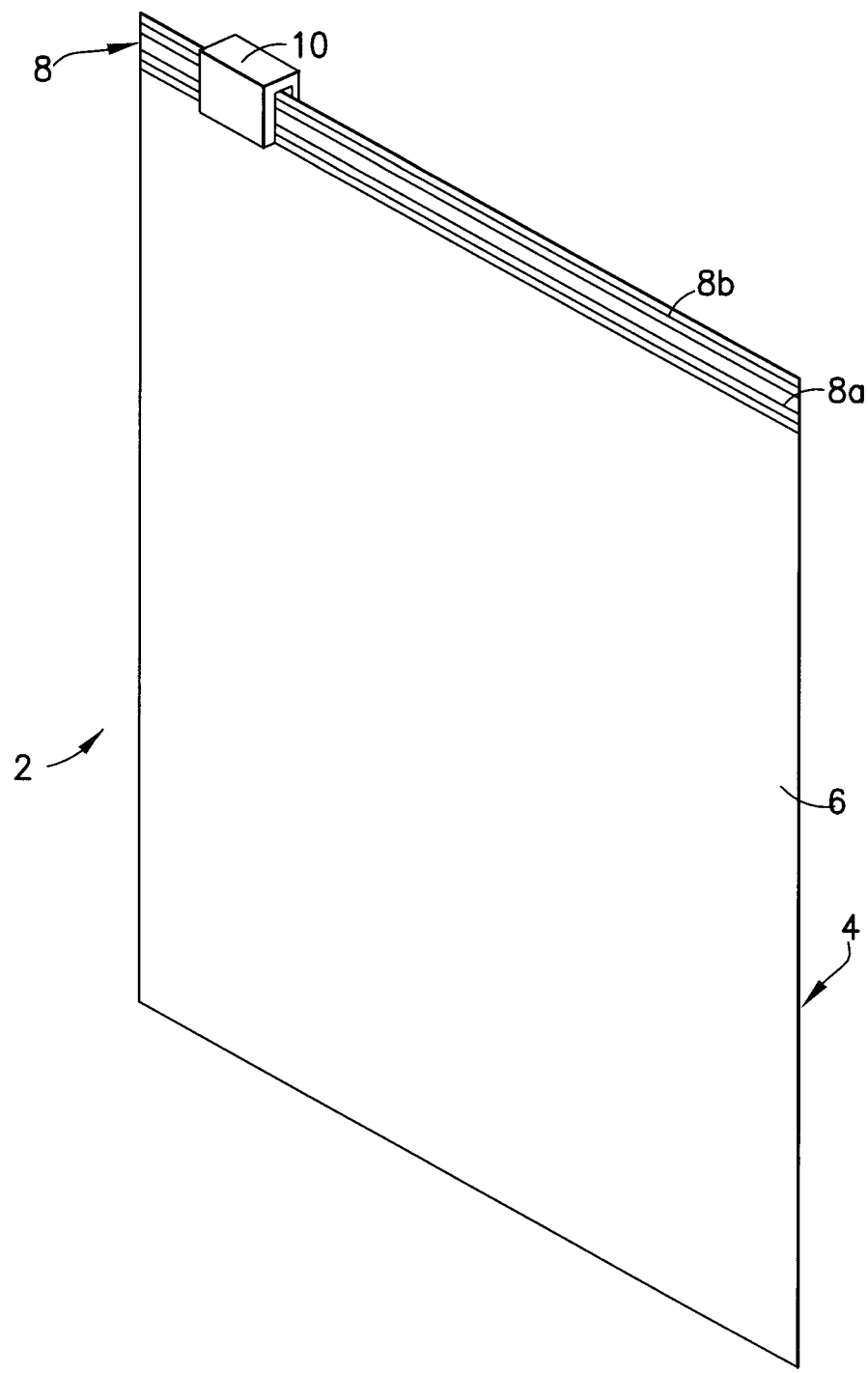
FIG. 1 is a diagram showing an isometric view of a reclosable pouch.

FIG. 1 shows a collapsible reclosable storage pouch 2 in accordance with one embodiment. The storage pouch 2 comprises a receptacle 4 consisting of a front wall or panel 6 and a rear wall or panel (not shown in FIG. 1, but see item 12 in FIG. 2), which are sealed together in left and right marginal regions along their side edges. Although not shown in FIG. 1, the bottom of the receptacle 4 has a one-way vent, comprising multiple collapsible channels, that extends from one side seal to the other. The front and rear walls are heat sealed together at multiple locations across the pouch bottom to form multiple collapsible channels that allow escape of air from the interior volume when the contents (not shown) of the receptacle are compressed, but prevent the entry of air into the receptacle when the external pressure is released. The walls of the receptacle may be formed of various types of gas-impermeable thermoplastic web material. The preferred gas-impermeable thermoplastics are nylon, polyester, polyvinyl dichloride and ethylene vinyl alcohol.

The upper marginal portions of the front and rear walls of the pouch 2 form a mouth in which a plastic closure 8 comprising double zippers 8a and 8b is installed. To maintain a vacuum inside the storage pouch, the closure 8 when closed must provide a hermetic seal at the mouth of the pouch. The closure is made from a plastic material that is less flexible than the plastic material of the pouch walls. The front and rear wall panels of the receptacle 4 are respectively sealed to the closure by lengthwise conduction heat sealing in conventional manner. Alternatively, the closure 8 can be attached to the wall panels by adhesive or bonding strips.

Still referring to FIG. 1, the zippers 8a and 8b can be closed using a device 10 commonly referred to as a "slider" or "clip", which straddles the closure 8. During use, one or more discrete compressible articles (not shown) may be placed inside the receptacle 4 while the closure 8 is open, i.e., while the interlockable closure elements of zippers 8a and 8b are disengaged from each other. After the article to be stored has been placed inside the receptacle, the closure 8 is closed by moving the slider 10 in either direction, from one end of the closure to the other, thereby pressing the closure elements of zippers 8a and 8b into interlocking relationship. Although the interlockable closure elements may have many different designs, the design must be one that ensures formation of an airtight seal at the receptacle mouth.

The pouch described above is designed for storing compressible articles. When the contents of the pouch with closed mouth are compressed by a user pushing down on the pouch, air inside the pouch is forced through the one-way vent at the pouch bottom, thereby forcing some or all of its collapsed channels open. When those channels have been fully opened, continued pushing down on the pouch causes the air that was forced into those channels to escape via respective air outlets (not shown). This procedure can be continued until the desired amount of air has been removed from the pouch 2. When the pressure exerted on the pouch by the user is removed, the opened channels collapse, thereby blocking the re-entry of ambient air into the pouch via those channels.

Figure 2:
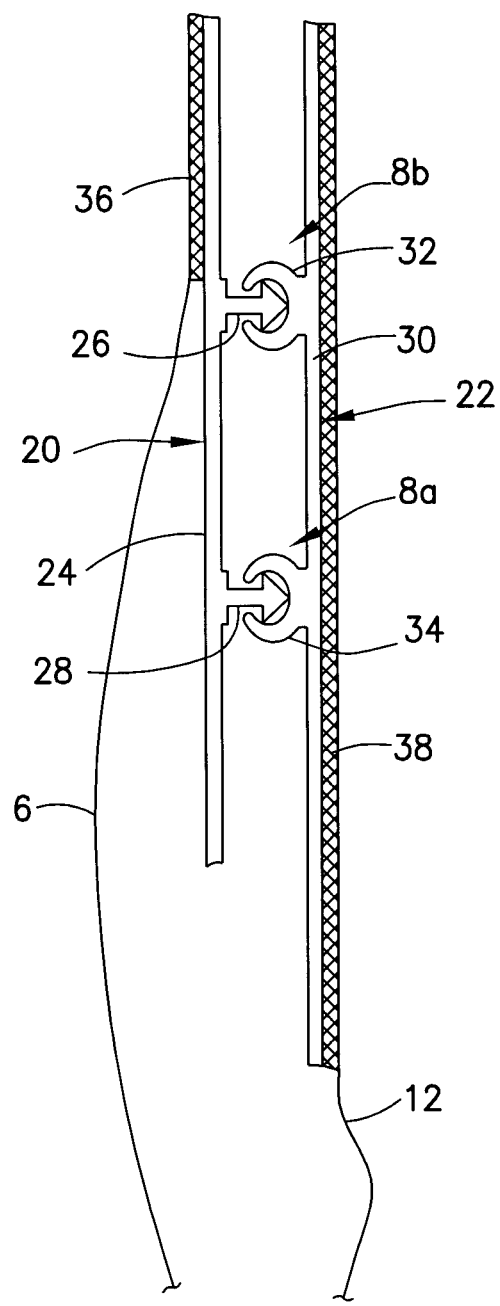
FIG. 2 is a diagram showing a sectional view of a double zipper attached to the walls of a reclosable pouch.

The present invention is not directed to any particular zipper construction. A suitable exemplary zipper construction is shown in FIG. 2. The closure 8 comprises a pair of extruded zipper strips 20 and 22 that are joined to each other in respective zipper crush areas at opposing ends of the closure. Zipper strip 20 comprises a web or flange 24 and a pair of mutually parallel male closure elements 26 and 28; zipper strip 22 comprises a web or flange 30 and a pair of mutually parallel female closure elements 32 and 34 which receive and grasp male closure elements 26 and 28 respectively. The closure elements 26 and 32 are designed to form an airtight zipper 8a when male closure element 26 is seated in female closure element 32 along the entire length of the pouch mouth. Likewise the closure elements 28 and 34 are designed to form an airtight zipper 8b when male closure element 28 is seated in female closure element 34 along the entire length of the pouch mouth.

As previously noted, the zipper flanges 24 and 30 are more rigid than the adjoining pouch walls 6 and 12. In accordance with one embodiment, only an uppermost portion of zipper flange 24 is attached to an uppermost marginal portion of pouch wall 6 by means of a heat seal 36, which heat seal does not extend to the elevation of male closure element 26. Thus, as seen in FIG. 2, a major portion of zipper flange 24 is not attached to the pouch. Meanwhile the entirety of zipper flange 30 is attached to an uppermost marginal portion of pouch wall 12 by means of a heat seal 38. This configuration prevents the zippers 8a and 8b from being forced open when the user compresses the pouch contents because a pressure is exerted on the unattached portion of zipper flange 24 which urges the zippers 8a and 8b to stay engaged rather than forcing the zipper flanges apart, as would be case if the entireties of both flanges were attached to the pouch walls.

FIG. 2 shows the zippers 8a and 8b in respective closed states. The uppermost marginal portions of the pouch mouth (including the uppermost marginal portions of the zipper flanges 24 and 30) can be gripped by the user and pulled apart to open the closed zippers. The opened zipper can be reclosed by pressing the closure elements together along the entire length of pouch mouth, using a slider. Typically, such a slider takes the form of a U-shaped clip that fits over the zipper with clearance for the upper flanges, while the legs of the clip cam the closure elements of the incoming zipper section into engagement when the slider is moved along the zippers in either direction. In each pouch, opposing ends of the zipper strips 24 and 30 are typically fused together in the regions of the pouch side seals.

In a known method for making hermetically sealed zipper joints, the closure elements are crushed in respective areas at opposite ends of the pouch mouth. This known method produces flattened material in crush zones at opposite corners of the pouch. However, it would be desirable to provide structure in the crush zones for preventing the slider from coming off a pouch corner when the consumer closes the double zipper. A pouch without a slider is difficult to close.

In accordance with one embodiment, a method of manufacture is provided whereby a slider end stop 14 is formed in the each upper corner 50 of the pouch to prevent a slider 10 from coming off. In addition, the crushed zipper material adjacent the uncrushed ends of the closure elements is formed into respective zipper terminations 16 and 18 that form leakproof seals at the ends of the closure elements.

Figure 3:
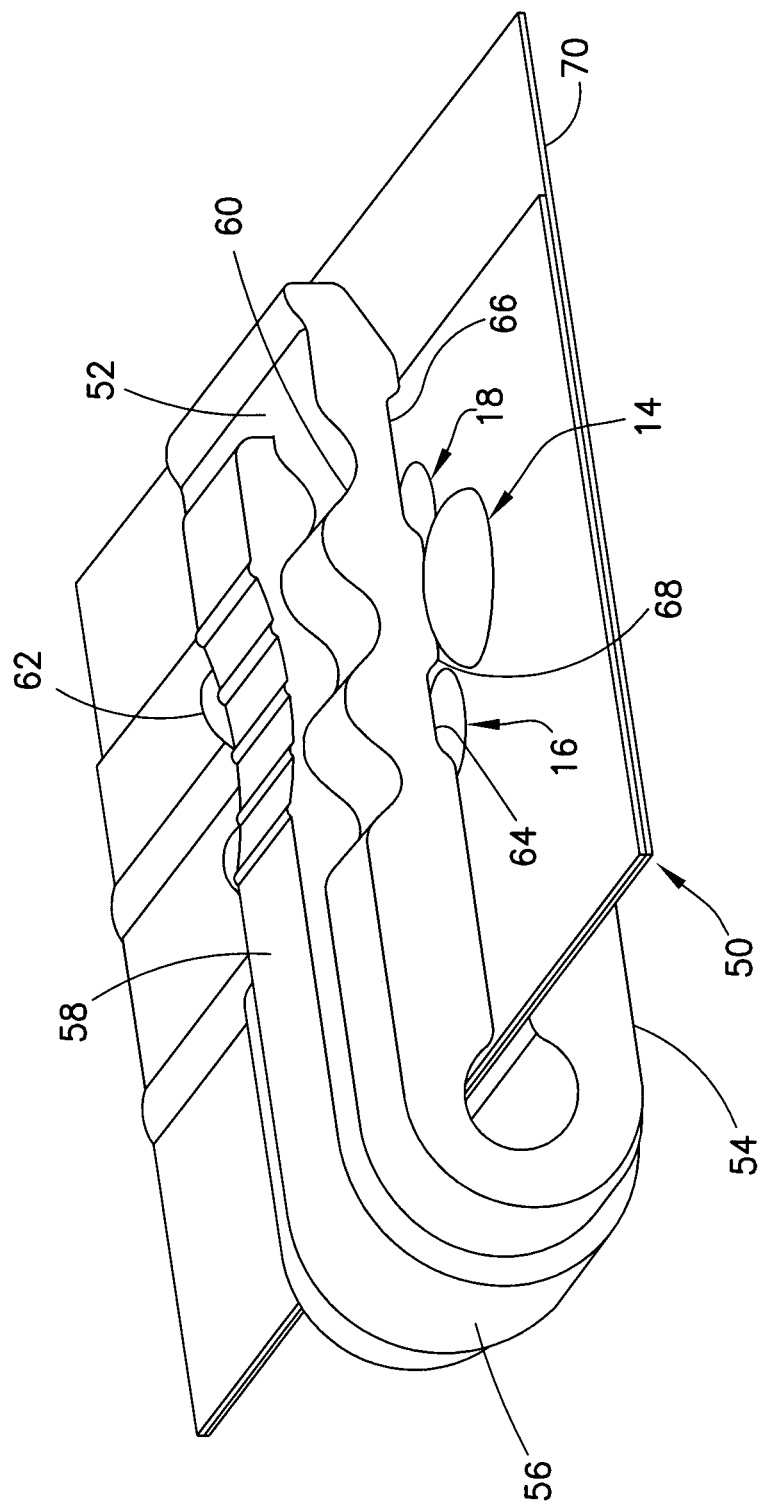
FIG. 3 is a drawing showing an isometric view of a corner at one end of the mouth of a reclosable pouch, which corner has dome-shaped structures for stopping a slider and leak-proof zipper terminations in accordance with one embodiment.

The slider 10 shown in FIG. 3 has a generally U-shaped profile, with respective legs disposed on opposing sides of the two-zipper closure. The gap between the slider legs is small enough that the zippers 8a and 8b can pass through respective slider gaps only if each zipper is in a closed state. Thus when the slider 10 is moved along an open closure, this has the effect of pressing the incoming sections of the closure elements together to close the mouth. A suitable slider is disclosed in U.S. Pat. No. 7,490,989. The slider 10 can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

In accordance with the embodiment depicted in FIG. 3, each of the pouch corners at opposing ends of the closure has respective dome-shaped structures 44 on opposing sides of the pouch (only one dome is visible in FIG. 3), the distance between the peaks of the oppositely extending domes being sufficiently greater than the width of the gap between those contacting portions of the slider legs that the slider is stopped and cannot pass over the domes (as depicted in FIG. 3). Thus, FIG. 3 shows the slider 10 at the limit of its travel along the closure. The slider can travel no further in the direction of the dome due to the dome-shaped obstacles 44 in its path and thus is prevented from falling off the pouch.

As seen in FIG. 3, the slider 10 is generally U-shaped and comprises mutually opposing sidewalls 52 and 54, a bridge 56 connecting the sidewalls 52 and 54, and a generally U-shaped stiffening rib 58 projecting outward from sidewalls 52, 54 and bridge 56. The sidewalls 52 and 54 are separated by a gap of varying width. In FIG. 3, the gap is not visible due to the presence of the pouch corner 50 therein. Preferably the slider is made by injection molding, so that the stiffening rib is integral with the sidewalls and bridge. On one side of the stiffening rib 58, the sidewalls and bridge form a first generally clip-shaped structure 60 having undulating external surfaces. On the other side of the stiffening rib 58, the sidewalls and bridge form a second generally clip-shaped structure 62 that is the same as structure 60.

Each sidewall 52, 54 of the slider has a pair of mutually parallel linear grooves 64 and 66 (only the grooves of sidewall 52 are visible in FIG. 3). The grooves 64 and 66 of sidewall 52 respectively oppose identical grooves on the other sidewall. These grooves ride on the tracks formed by the interlocked closure elements of zippers 8a and 8b as the slider travels from one pair of dome-shaped slider end stops at one end of the zipper to the other pair of dome-shaped slider end stops at the other end of the zipper. These grooves cam the closure elements of the incoming zipper section into engagement when the slider is moved along the zippers in either direction, thereby hermetically sealing the pouch mouth.

The grooves 64 and 66 define a plateau or ridge 68 therebetween, as seen in FIG. 3. An identical plateau on the other sidewall is not visible in FIG. 3. The opposing plateaus 68 form a gap that is less than the combined height of the oppositely projecting back-to-back domes 44. The domes 44 are placed so that they lie in the path of plateaus 68 as the slider approaches the domes. Thus, the ends of the plateaus 68 will abut the domes 44 on respective sides of the pouch corner 50 when the consumer pulls the slider toward the pouch side edge 70. The slider 10 and the domes 44 are sufficiently rigid and the difference between the plateau gap and the dome combined height is sufficiently great that the opposing plateaus 68 cannot easily pass over the domes 44 after they come into contact.

In accordance with the embodiment depicted in FIG. 3, each of the pouch corners at opposing ends of the closure also has respective pairs of half dome-shaped projections 46 and 48 arranged back to back on opposing sides of the pouch (only one pair of these projections is visible in FIG. 3). Alternatively, projections 46 and 48 may be dome-shaped or having any shape intermediate a half dome and a full dome. The distance between the peaks of back-to-back projections 46 and 48 is sufficiently greater than the width of the gap between the plateaus 68 that, when the slider has been stopped by domes 44 as depicted in FIG. 3, the back-to-back projections 46 and 48 pose respective obstacles to upward and downward movement of the plateaus 68 while they are in contact with domes 44. In the embodiment depicted in FIG. 3, at least part of each projection 46 or 48 has the shape of a half-dome with a rounded half-circumference facing away from the respective uncrushed closure element, the back side of each pair of back-to-back half dome-shaped projections being integrally connected and hermetically sealed to respective uncrushed closure elements, thereby providing leakproof transitions from uncrushed closure element to crushed closure element at the ends of the zippers over an angle of at least 180 degrees relative to the end of the uncrushed closure element.

Figure 4:
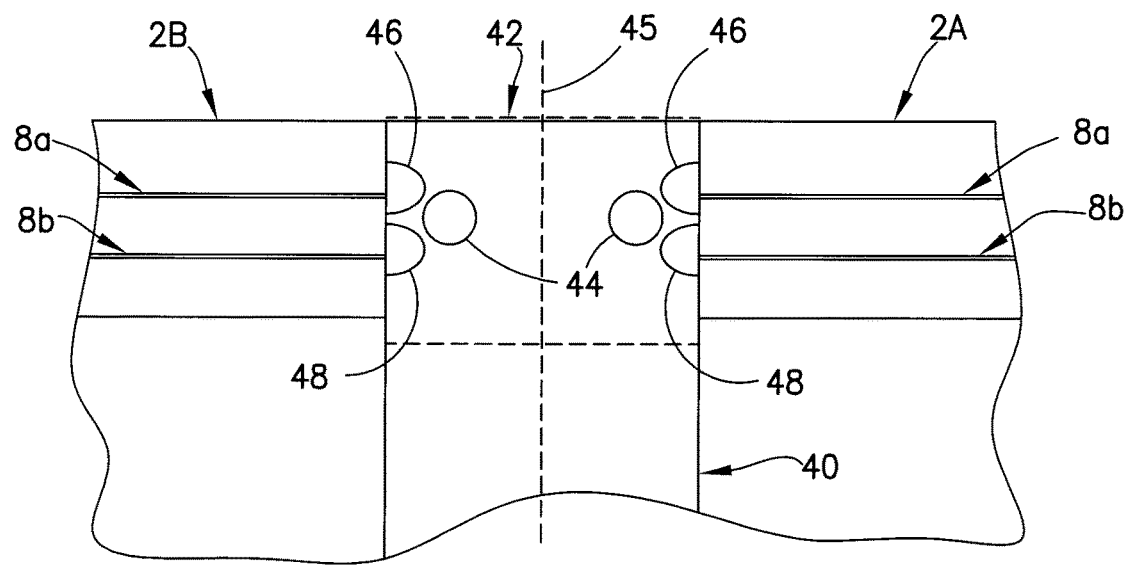
FIG. 4 is a drawing showing a plan view of a portion of two connected pouch precursors in process, the depicted portion including an area where the interlockable closure elements have been crushed and then the plastic material in the crush area has been deformed to make slider end stops and zipper terminations of the types depicted in FIG. 3.

FIG. 4 is plan view showing one side of a portion of two connected pouch precursors in process, the depicted portion including a transverse rectangular area 40 where two sheets of bag making film have been heat sealed together and an area 42 where the closure elements have been crushed and then the plastic material in the crush area has been formed into a pair of slider end stops 14 and respective pairs of zipper terminations 16 and 18. The dashed line 45 in FIG. 4 indicates where the transverse heat seal 40 and the crush area 42 will be cut, thereby severing a completed pouch on one side of cut line 45 from the chain of pouch precursors on the other side of cut line 45.

Each transverse heat seal 40 is made wide enough so that respective halves of the heat sealed area can be incorporated into separate pouches. More specifically, the cross-sealed area 40 is bisected by cutting along a line 45 transverse to the closure 8. The area to the right of the cut line 45 forms the trailing side seal of the leading pouch precursor 2A (assuming advancement of the chain of pouch precursors from left to right in FIG. 4), while the area to the left of the cut line 45 forms the leading side seal of the trailing pouch precursor 2B.

As seen in FIG. 4, the centers of the round slider end stops 14 are located along a line which is parallel to and, if extended, would be located midway between the closure elements of zippers 8a and 8b. Although the slider end stops 14 and the zipper terminations 16 and 18 shown in FIG. 4 appear to share a common tangent T that is parallel to the transverse cut line 45, the tangent common to zipper terminations 16 and 18 may be separated from the nearest parallel line that would be tangent to dome 14a by a small distance (e.g., a few hundredths of an inch in some implementations). The centerlines of zipper terminations 16 and 18 are separated by a distance equal to the distance between the centerlines of the male closure elements of zippers 8a and 8b.

Figure 5:
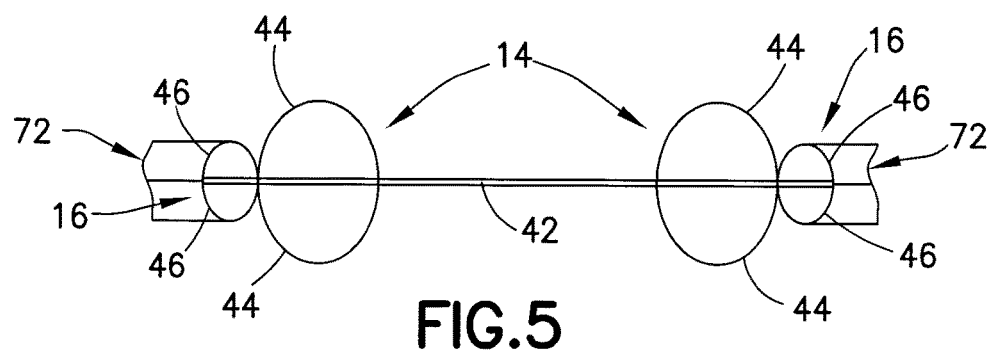
FIG. 5 is a drawing showing a top view of the zipper crush area depicted in FIG. 4.

FIG. 5 shows a top view of the zipper crush area 42 depicted in FIG. 4. As can be seen in FIG. 5, the zipper crush area 42 has two pairs of back-to-back domes 44 and two upper pairs of back-to-back half dome-shaped projections 46 on both sides (i.e., front and back) of the pouch. The two lower pairs of back-to-back half dome-shaped projections (items 48 in FIG. 4) on both sides (i.e., front and back) of the pouch are not visible in FIG. 5. Each pair of domes 44 are disposed back to back to form a respective slider end stop 14. The half dome-shaped projections (items 46 and 48 in FIGS. 4 and 5) are similarly disposed back to back to form zipper terminations 16 and 18, which serves as leakproof transitions from uncrushed portions 72 of the interlocked closure elements to adjacent areas where portions of the same interlocked closure elements have been crushed.

The pouch described above can be manufactured on an automated production line. For example, two webs of thermoplastic material, having the same width, can be paid out from respective rolls. Downstream respective sets of pull rollers are provided for pulling the webs through the pouch making machine. At the same time continuous lengths of the zipper strips depicted in FIG. 2 are paid off respective spools and advanced to respective stations whereat the backs of the zipper strips are positioned in overlying relationship with the marginal portions of the respective webs of bag making film. Typically the webs and the zipper strips are advanced intermittently and all manufacturing operations are performed during dwell times. At a pair of parallel sealing stations, the zipper strips are joined to the respective webs in well-known manner, for example, by conductive heat sealing (see heat seals 36 and 38 in FIG. 2). Then the webs with attached zipper strips are brought together in a manner that causes the respective webs to overlap and the closure elements of the respective zipper strips to interlock. (Alternatively, the interlocked zipper strips could be placed between the overlapping webs of bag making film and joined to webs in one operation.) At the next station, the marginal web portions on the side opposite the zippers (which portions will become the bottom of the pouches) are heat sealed to form collapsible channels for venting air when the pouch contents are compressed. A teaching of this operation can be found in International Patent Application No. PCT/US11/57389 filed on Oct. 21, 2011. At the next station, transverse heat seals are formed across the two webs, which seals will become the pouch side seals after being bisected during a cutting operation. Between each transverse heat sealing operation, the webs are advanced by a distance equal to one pouch width. In accordance with one implementation, the work in process then advances in succession through four stations where the crush area 42 with dome-shaped slider end stops and zipper terminations (see FIG. 4) is formed in stages. Within the crush zone 42, the closure elements are thermally crushed, i.e., flattened, and then the crushed zipper material is deformed into the protruding shapes depicted in FIG. 5.

FIGS. 6 through 11 show four different tools which are employed in pairs at four successive stations of an automated production line for making reclosable pouches, which tools are utilized to form the structures depicted in FIGS. 4 and 5. These successive stations will hereinafter be respectively referred to (in order) as the zipper crush station, the zipper stepped crush station, the slider end stop pre-forming station and the slider end stop post-forming station. Each of these stations comprises a stationary tool and a reciprocating tool which are arranged in mutually confronting relationship. The reciprocating tool alternately extends and retracts toward and away from the stationary tool, with the work in process therebetween. When the reciprocating tool is fully extended, the work surfaces of the opposing tools at each station shape the plastic zipper material in contact therewith. However, the work surfaces of the opposing tools, which are the same for each pair, have a different geometry for each station, as explained in detail hereinafter. Each tool can be made from heat-treated A-2 tool steel or other suitable metal alloy.

Figure 6:
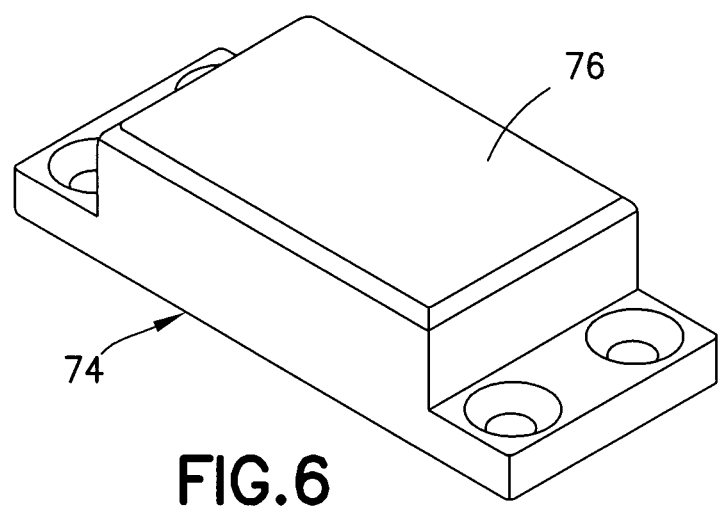
FIGS. 6 through 11 show four different tools which are employed in pairs at successive stations of an automated production line for making reclosable pouches, which tools are utilized to form the structures depicted in FIGS. 3 and 4.

The zipper crush station comprises two mutually confronting tools of the type 74 depicted in FIG. 6. Each tool 74 (only one of which is shown in FIG. 6) comprises a heated rectangular metal block having a rectangular planar contact surface 76 and rounded edges along the perimeter of planar surface 76. The planar contact surfaces 76 of opposing tools 74 are pressed together with a section of the interlocked plastic zipper strips (with attached bag film) therebetween. The temperature between the contacting surfaces and the resulting pressure applied are controlled to at least partially crush the male and female closure elements. After each crushing cycle, the work in process is advanced one pouch width and then the crushing operation is repeated on a different section of the interlocked plastic zipper strips.

Figure 7:
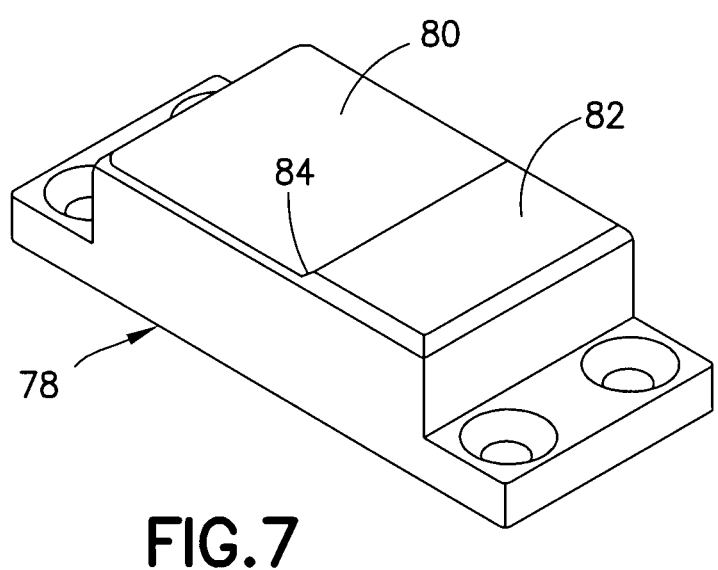
Figure 8:
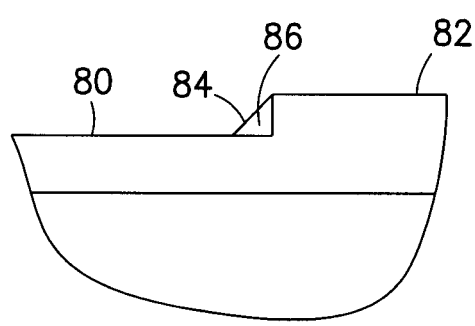

The second (stepped) zipper crush station comprises two mutually confronting tools of the type 78 depicted in FIGS. 7 and 8. Each tool 78 (only one of which is shown in FIG. 7) comprises a heated rectangular metal block having a rectangular stepped face and rounded edges along the perimeter of the stepped face. The stepped face comprises a rectangular planar surface 80, a stepped rectangular planar surface 82 and a beveled surface 84 (e.g., with a bevel angle of 45 degrees) that connects to planar surfaces 80 and 82. As seen in FIG. 8, there is a triangular facet 86 at each end of beveled surface 84 instead of a rectilinear corner.

The stepped planar surfaces 82 of opposing tools 78 are pressed together with a minor portion of the zipper crush zone therebetween. The temperature between the contacting surfaces and the resulting pressure applied are controlled to cause some of the plastic zipper material to flow in the compressed zone to flow toward the lower portion of the closure. This downward displacement of plastic material provides additional material for the formation of slider end stops and zipper terminations in the central portion of the closure during subsequent operations. After each stepped crushing cycle, the work in process is advanced one pouch width and then the stepped crushing operation is repeated on a different crushed section of the work in process.

Figure 9:
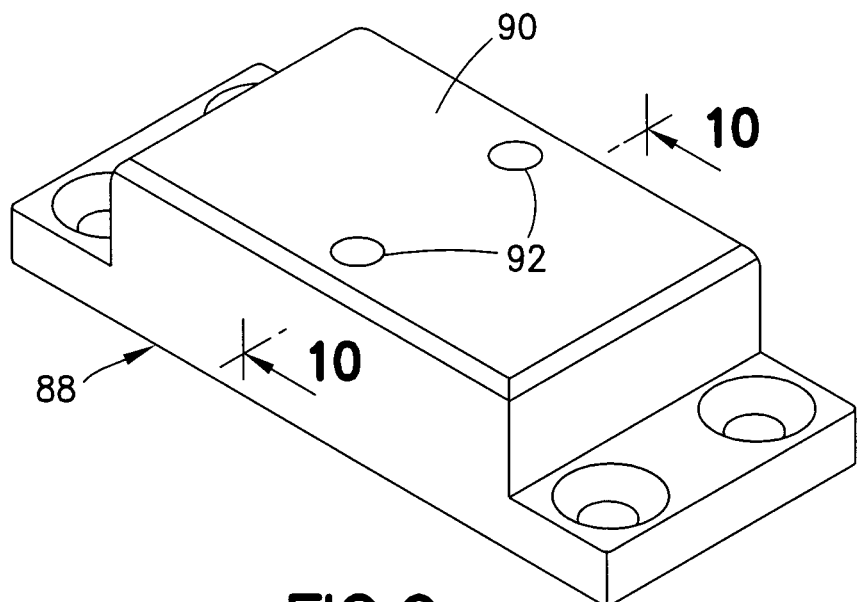
Figure 10:
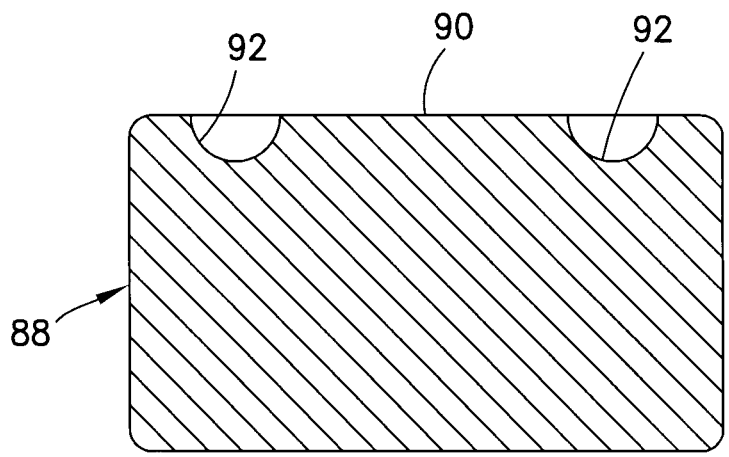

The slider end stop pre-forming station comprises two mutually confronting dies of the type 88 depicted in FIGS. 9 and 10. Each die 88 comprises a heated rectangular metal block having a dimpled face and rounded edges along the perimeter of the dimpled face. The dimpled face comprises a rectangular planar surface 90 and a pair of preferably identical hemispherical depressions 92 (hereinafter "dimples") positioned as shown. The dimples 92 are shown in mid-cross section in FIG. 10.

The dimpled faces of opposing dies 88 are pressed together with the crush zone therebetween. The temperature between the contacting planar surfaces 90 and the resulting pressure applied are controlled to cause some of the plastic zipper material to flow into and fully occupy dimples 92. The displaced material in dimples 92 forms respective domes that are precursors of the final slider end stops. After this pre-forming operation, the diameter of these dome-shaped slider end stop precursors will be less than the diameter of the dome-shaped projections on completed pouches. The distance between the centers of dimples 92 is equal to two times the desired distance of the center of each slider end stop to the nearest edge of each completed pouch. After each pre-forming cycle, the work in process is advanced one pouch width and then the pre-forming operation is repeated on a different crushed section of the work in process.

Figure 11:
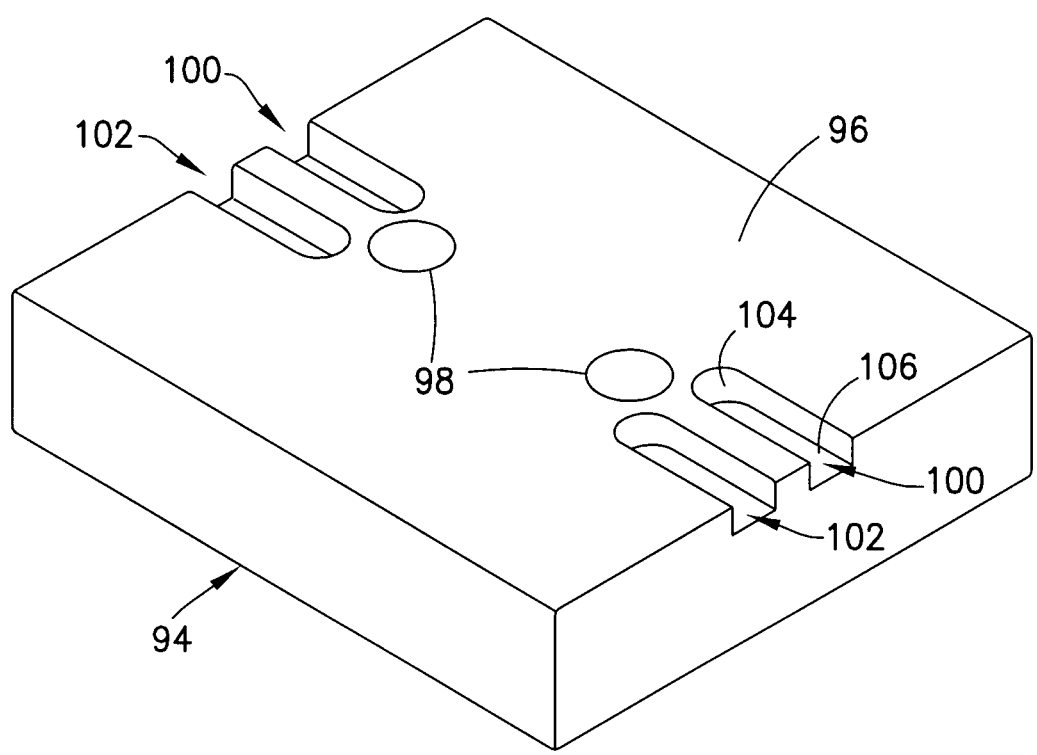
Figure 12:
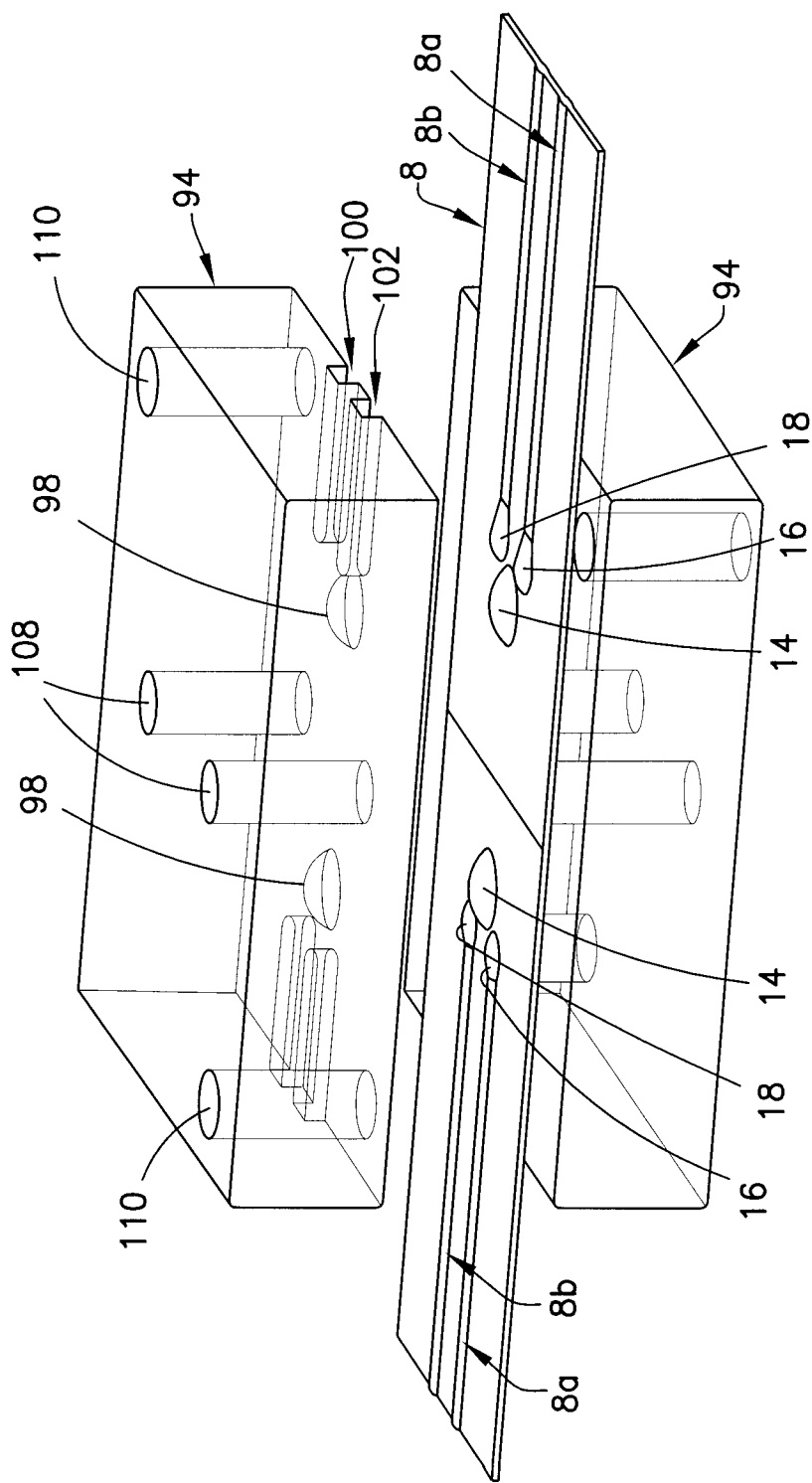
FIG. 12 is a diagram showing an isometric view of two mutually opposing tools of the type depicted in FIG. 11, with a post-formed section of a zippered portion of work in process therebetween.

The slider end stop post-forming station comprises two mutually confronting dies of the type 94 depicted in FIGS. 11 and 12. Each die 94 comprises a cold rectangular metal block having a rectangular contact face surrounded by rounded edges. The dies 94 can be cooled by a cold air gun directed at the dies or by coolant from a chiller that circulates in channels formed in the dies. The rectangular contact face of each die 94 comprises a rectangular planar surface 96, a pair of preferably identical hemispherical depressions 98 (hereinafter "dimples") positioned as shown, and two pairs of zipper termination channels, each pair including an upper channel 100 and a lower channel 102. The zipper termination channels of each pair are mutually parallel to a hypothetical line connected the centers of dimples 98 and extend from a respective one of opposing sides of the die 94. In accordance with the embodiment shown in FIG. 11. each zipper termination channel comprises a channel wall 104 that is semicircular at the closed end of the channel and a flat bottom 106 that extends to an open end of the channel. The channels 100 and 102 provide clearance for the zipper profiles during formation of the slider end stops. During this operation, zipper material tends to flow into these channels at their closed ends. The surface tension of the molten zipper material tends to cause the material in channels 100 and 102 to form round projections, such as the dome-shaped projections 46 and 48 seen in FIG. 4. The centerlines of channels 100 and 102 are separated by a distance equal to the distance between the midpoints of the male closure elements on the closure.

The faces of opposing dies 94 are pressed together with the crush zone, now with slider end stop precursors, therebetween. The dimples 98 on dies 94 are aligned with the slider end stop precursors (not shown in FIG. 11) so that the latter are received in the former, but with empty space between the slider end stop precursor surfaces and the surfaces of depressions 98. The pressure exerted by the contacting planar surfaces 96 is sufficient to cause some of the plastic zipper material to flow into and fully occupy the empty spaces inside dimples 98. The additional displaced material fills dimples 98 to form respective domes that will serve as slider end stops in the completed pouch after the plastic has cooled. In addition, plastic zipper material flows into the rounded ends of channels 102 and 104 and, upon cooling, will form zipper terminations having rounded or partially rounded shapes.

FIG. 12 shows the separated dies 94 after the slider end stops 14 and zipper terminations 16, 18 have been formed on closure 8. To avoid clutter in the drawing, FIG. 12 does not show the pouch walls which are sealed to the backs of respective zipper flanges of closure 8, as seen in FIG. 2. As seen in FIG. 12, each die 94 has a pair of threaded bores 108 spaced apart in a central section and a pair of unthreaded bores 110 at diagonally opposed corners. The unthreaded bores 110 of each die 94 receive respective alignment pins projecting from a respective die support plate (not shown) installed at the post-forming station, while each die 94 is affixed to the respective die support plate by means of threaded bolts received in threaded bores 108.

After each post-forming cycle, the work in process is advanced one pouch width and then the post-forming operation is repeated on a different crushed section of the work in process. At the next station (see FIG. 4), the distal pouch precursor 2A is severed from the adjacent pouch precursor 2B by cutting along line 45.

Alternatively, the chain of pouch precursors (each pouch precursor having slider end stops and zipper terminations as described above) could be wound on a roll (i.e., without cutting) for transport to a cutting station. Thus, it is within the scope of this invention to not sever each completed pouch at the leading end of the chain of pouch precursors and instead to wind the chain of pouch precursors on a roll for transport to another location. At such other location, the connected pouch precursors can be unwound from the roll and severed to form individual pouches.

Figure 13:
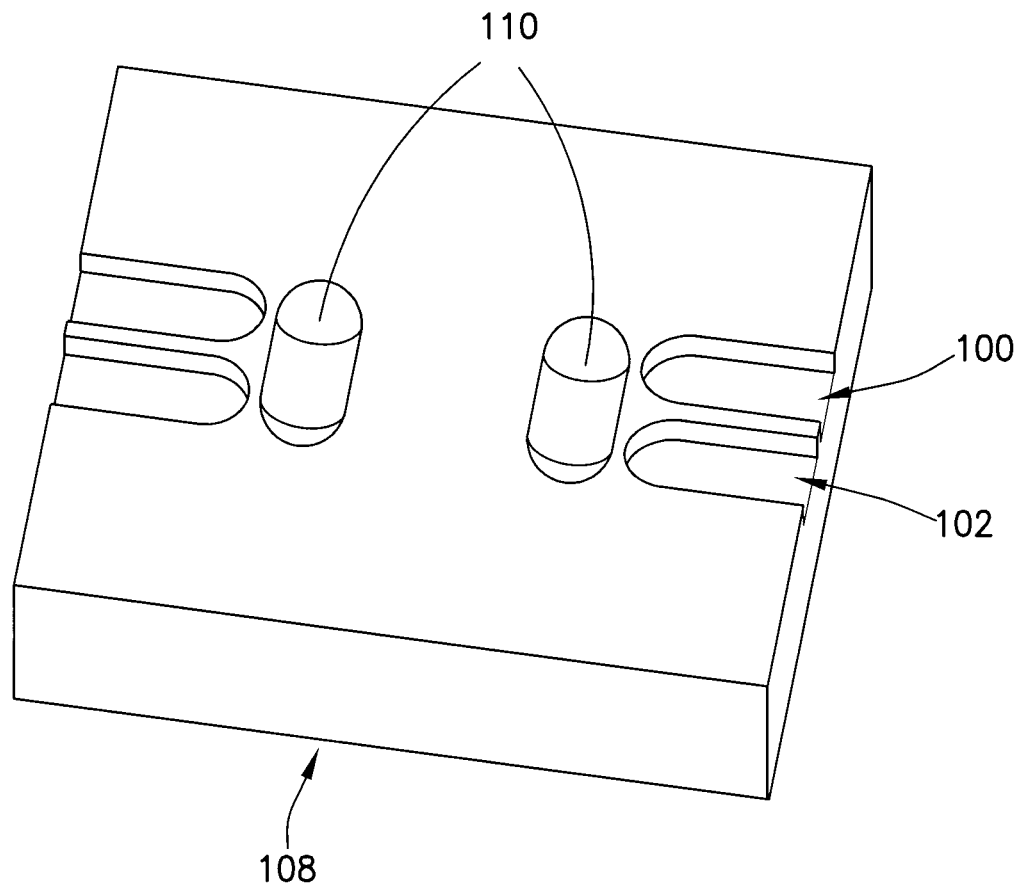
FIG. 13 is a diagram showing an isometric view of a tool having two oval-shaped dimples and four zipper termination channels, which tool is one of two opposing tools used at a post-forming station for forming crushed plastic material into respective oval-shaped domes of sufficient height to stop the slider at the ends of the double zipper.
Figure 14:
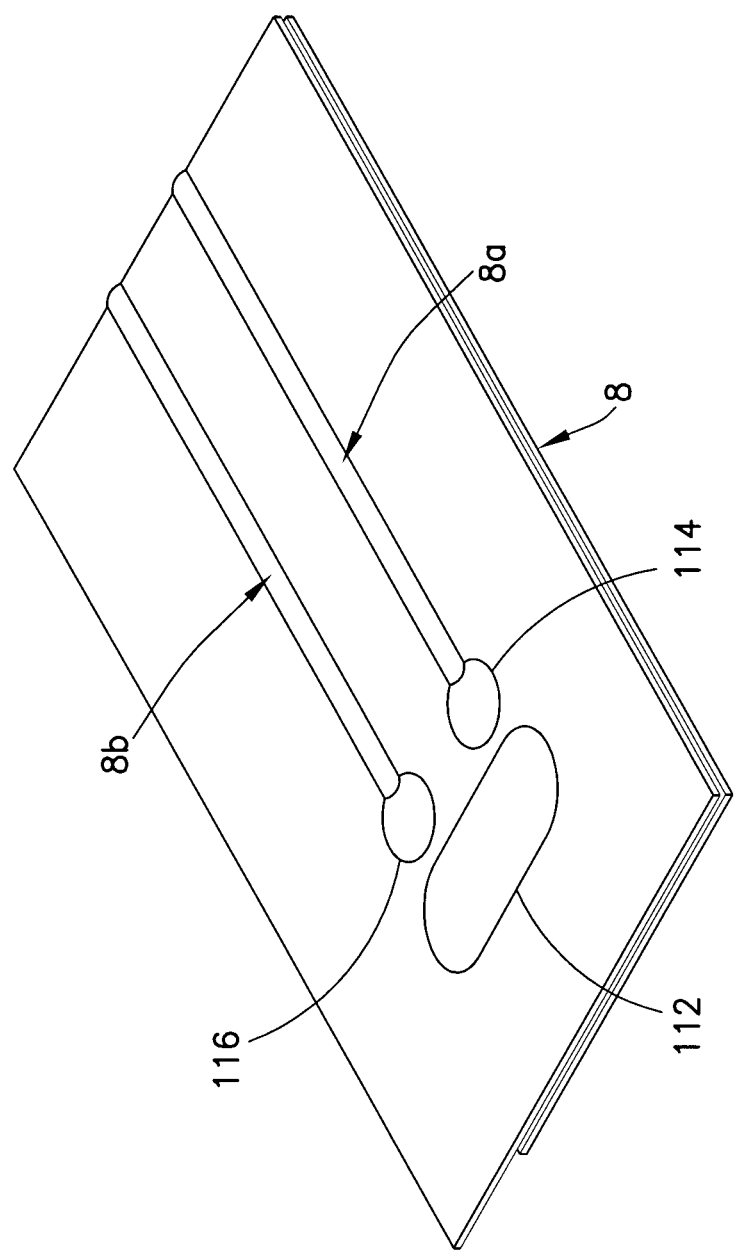
FIG. 14 is a diagram showing an isometric view of a corner at one end of the mouth of a reclosable pouch made using dies of the type depicted in FIG. 13.
Figure 15:
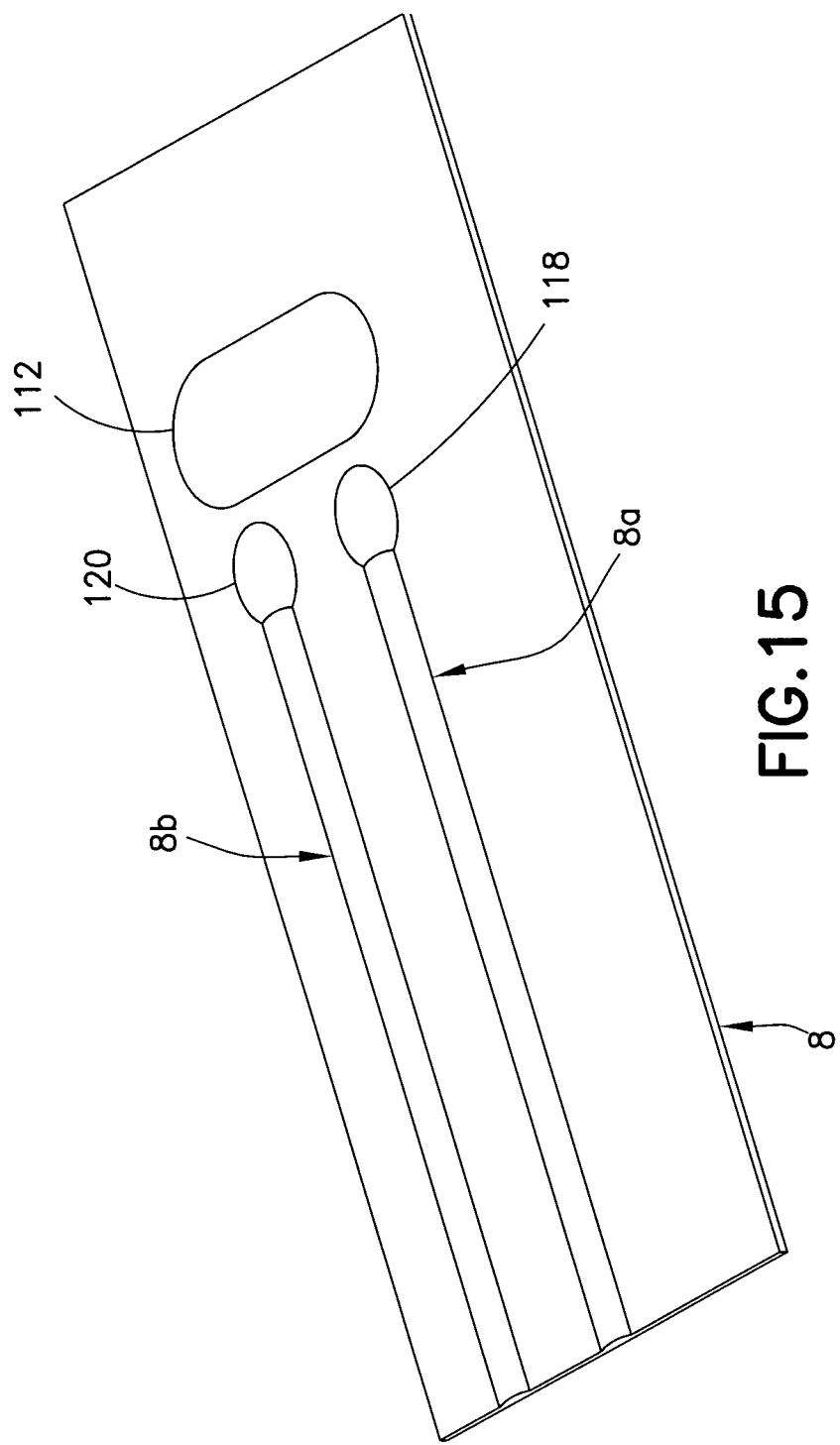
FIG. 15 is a diagram showing an isometric view of a corner at one end of the mouth of a reclosable pouch having oval-shaped slider end stops and oval-shaped zipper terminations in accordance with an alternative embodiment.

In accordance with an alternative embodiment, the dome-shaped slider end stops may be oval, not circular. FIG. 13 shows a die 108 having two oval-shaped dimples 110 and two pairs of zipper termination channels 100 and 102, which die is one of two opposing dies used at a post-forming station for forming crushed plastic material into respective oval-shaped domes of sufficient height to stop the slider at the ends of the double zipper. The result crush zone structure is shown in FIG. 14. Each upper corner of the pouch has an oval-shaped rounded projection 112 on both sides of the closure 8 and a pair of dome-shaped zipper terminations 114 and 116. FIG. 15 shows a further alternative embodiment in which the zipper terminations 118 and 120 are oval-shaped, not circular as in FIG. 14.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The method claims set forth hereinafter should not be construed to require that all operations of the method be performed in alphabetical order or in the order in which they are recited.

The invention claimed is:

1. A reclosable pouch comprising:
   (A) a receptacle having a storage chamber and a mouth in communication with the storage chamber, the receptacle comprising a first sidewall and a second sidewall connected to the first sidewall so as to form the storage chamber;
   (B) a hermetically sealable closure attached to the mouth, the closure comprising a first zipper strip and a second zipper strip, the first and second zipper strips being fused together in (a) a first zone situated at a first end of the closure and (b) a second zone situated at a second end of the closure, the second end opposing the first end, with a space between the first and second zones, and (a) a portion of the first zipper strip in the space between the first and second zones comprising (i) a first flange and (ii) first and second closure elements projecting from the first flange, and (b) a portion of the second zipper strip in the space between the first and second zones comprising (i) a second flange and (ii) third and fourth closure elements projecting from the second flange, the first through fourth closure elements extending along the space between the first and second zones, and the first and third closure elements forming a first zipper that terminates in a first zipper termination at each of the first and second zones, the second and fourth closure elements forming a second zipper that terminates in a second zipper termination at each of the first and second zones, with a space between the first and second zippers, the first zipper termination at each of the first and second zones comprising a first pair of projections arranged back to back on the first and second sidewalls of the receptacle at each of the first and second zones, each of the projections of the first pair of projections having a peak, the second zipper termination at each of the first and second zones comprising a second pair of projections arranged back to back on the first and second sidewalls of the receptacle at each of the first and second zones, each of the projections of the second pair of projections having a peak, the first pair of projections at each of the first and second zones being separate and distinct from the second pair of projections at each of the first and second zones, and each of the first and second pairs of projections providing a leakproof transition from (i) the respective portion of the respective first and second zipper strips in the space between the first and second zones to (ii) the respective first and second zones;

(C) a slider mounted to the closure and configured to travel along the first and second zippers, the slider comprising a first sidewall and a second sidewall, each sidewall including (a) a pair of linear grooves, with each linear groove of the pair of linear grooves configured to travel along a respective one of the first and second zippers, and (b) a protruding portion that (i) is positioned between each linear groove of the pair of linear grooves, (ii) is disposed in the space between the first and second zippers and (iii) protrudes into the space between the first and second zippers, the slider further including a gap formed between the protruding portion of the first sidewall and the protruding portion of the second sidewall;

(D) a first pair of round projections arranged back to back on the first and second sidewalls of the receptacle, the first pair of round projections being positioned at the first end of the closure in the first zone, each of the round projections of the first pair of round projections being spaced from as well as separate and distinct from each of (i) the first and second zipper terminations of the first and second zippers and (ii) the first and second pairs of projections of the first and second zipper terminations; and (E) a second pair of round projections arranged back to back on the first and second sidewalls of the receptacle, the second pair of round projections being positioned at the second end of the closure in the second zone, each of the round projections of the second pair of round projections being spaced from as well as separate and distinct from each of (i) the first and second zipper terminations of the first and second zippers and (ii) the first and second pairs of projections of the first and second zipper terminations, wherein (i) each pair of the first and second pairs of round projections prevents travel of the slider at the respective end of the closure upon contact of the respective protruding portions of the first and second sidewalls of the slider with the respective pair of round projections, and (ii) a distance between the peaks of each of the projections of each of the first and second pairs of projections of the first and second zipper terminations is greater than the width of the gap formed between the protruding portions of the first and second sidewalls of the slider, thereby preventing upward and downward movement of the slider at the respective ends of the closure upon contact of the respective protruding portions of the first and second sidewalls of the slider with the respective pair of projections of the respective first and second zipper terminations.

2. The reclosable pouch as recited in claim 1, wherein each of the round projections of the first and second pairs of round projections has a dome shape.

3. The reclosable pouch as recited in claim 1, wherein each of the round projections of the first and second pairs of round projections has a center disposed at a distance from a top edge of the flange of the first zipper strip, which is greater than a first distance of a midpoint of the first closure element from the top edge and less than a second distance of a midpoint of the second closure element from the top edge.

4. The reclosable pouch as recited in claim 1, wherein each of the first and second zones comprises a respective web that surrounds and connects to the respective pair of round projections.

5. The reclosable pouch as recited in claim 1, wherein the first zone has a width equal to a width of the first side seal.

6. The reclosable pouch as recited in claim 1, wherein the slider is u-shaped.

7. The reclosable pouch as recited in claim 1, wherein the protruding portion of the first sidewall and the protruding portion of the second sidewall each comprises a plateau.

8. The reclosable pouch as recited in claim 1, wherein each of the projections of the first and second pairs of projections of each of the first and second zipper terminations comprises one of a half-dome-shaped body and a dome-shaped body.

9. The reclosable pouch as recited in claim 8, wherein each of the projections of the first and second pairs of projections of each of the first and second zipper terminations comprises a half-dome-shaped body.

10. A reclosable pouch comprising:

(A) a receptacle having a storage chamber and a mouth in communication with the storage chamber, the receptacle comprising a first sidewall and a second sidewall connected to the first sidewall so as to form the storage chamber;

(B) a hermetically sealable closure attached to the mouth, the closure comprising a first zipper strip and a second zipper strip, the first and second zipper strips being fused together in (a) a first zone situated at a first end of the closure and (b) a second zone situated at a second end of the closure, the second end opposing the first end, with a space between the first and second zones, and (a) a portion of the first zipper strip in the space between the first and second zones comprising (i) a first flange and (ii) first and second closure elements projecting from the first flange, and (b) a portion of the second zipper strip in the space between the first and second zones comprising (i) a second flange and (ii) third and fourth closure elements projecting from the second flange, the first through fourth closure elements extending along the space between the first and second zones, and the first and third closure elements forming a first zipper that terminates in a first zipper termination at each of the first and second zones, the second and fourth closure elements forming a second zipper that terminates in a second zipper termination at each of the first and second zones, with a space between the first and second zippers, the first zipper termination at each of the first and second zones comprising a first pair of projections arranged back to back on the first and second sidewalls of the receptacle at each of the first and second zones, each of the projections of the first pair of projections having a peak, the second zipper termination at each of the first and second zones comprising a second pair of projections arranged back to back on the first and second sidewalls of the receptacle at each of the first and second zones, each of the projections of the second pair of projections having a peak, the first pair of projections at each of the first and second zones being separate and distinct from the second pair of projections at each of the first and second zones, and each of the first and second pairs of projections providing a leakproof transition from (i) the respective portion of the respective first and second zipper strips in the space between the first and second zones to (ii) the respective first and second zones;

(C) a slider mounted to the closure and configured to travel along the first and second zippers, the slider comprising first and second sidewalls, each sidewall including (a) a pair of linear grooves, with each linear groove of the pair of linear grooves configured to travel along a respective one of the first and second zippers, and (b) a protruding portion that (i) is positioned between each linear groove of the pair of linear grooves, (ii) is disposed in the space between the first and second zippers and (iii) protrudes into the space between the first and second zippers, the slider further including a gap formed between the protruding portion of the first sidewall and the protruding portion of the second sidewall;

(D) a first pair of projections arranged back to back on the first and second sidewalls of the receptacle, the first pair of projections being positioned at the first end of the closure in the first zone, each of the projections of the first pair of projections being spaced from as well as separate and distinct from each of (i) the first and second zipper terminations of the first and second zippers and (ii) the first and second pairs of projections of the first and second zipper terminations; and (E) a second pair of projections arranged back to back on the first and second sidewalls of the receptacle, the second pair of projections being positioned at the second end of the closure in the second zone, each of the projections of the second pair of projections being spaced from as well as separate and distinct from each of (i) the first and second zipper terminations of the first and second zippers and (ii) the first and second pairs of projections of the first and second zipper terminations, wherein (i) each pair of the first and second pairs of projections prevents travel of the slider at the respective end of the closure upon contact of the respective protruding portions of the first and second sidewalls of the slider with the first and second pairs of projections, and (ii) a distance between the peaks of each of the projections of each of the first and second pairs of projections of the first and second zipper terminations is greater than the width of the gap formed between the protruding portions of the first and second sidewalls of the slider, thereby preventing upward and downward movement of the slider at the respective ends of the closure upon contact of the respective protruding portions of the first and second sidewalls of the slider with the first and second pairs of projections of the respective first and second zipper terminations.

11. The reclosable pouch as recited in claim 10, wherein each of the projections of the first and second pairs of projections has a dome shape.

12. The reclosable pouch as recited in claim 10, wherein each of the projections of the first and second pairs of projections has a center disposed at a distance from a top edge of the first zipper flange that is greater than a first distance of a midpoint of the first closure element from the top edge and less than a second distance of a midpoint of the second closure element from the top edge.

13. The reclosable pouch as recited in claim 10, wherein each of the first and second zones further comprises a respective web that surrounds and connects the respective pair of projections.

14. The reclosable pouch as recited in claim 10, wherein the slider is u-shaped.

15. The reclosable pouch as recited in claim 10, wherein the protruding portion of the first sidewall and the protruding portion of the second sidewall each comprises a plateau.

16. The reclosable pouch as recited in claim 10, wherein each of the projections of the first and second pairs of projections of each of the first and second zipper terminations comprises one of a half-dome-shaped body and a dome-shaped body.

17. The reclosable pouch as recited in claim 16, wherein each of the projections of the first and second pairs of projections of each of the first and second zipper terminations comprises a half-dome-shaped body.

* * * * *